United States Patent
Doi et al.

(10) Patent No.: US 8,424,189 B2
(45) Date of Patent: Apr. 23, 2013

(54) ROTARY TABLE FOR PERMANENT MAGNET ROTATING MACHINE AND METHOD FOR MANUFACTURING PERMANENT MAGNET ROTATING MACHINE

(75) Inventors: Yuhito Doi, Tokyo (JP); Hideki Kobayashi, Tokyo (JP); Takehisa Minowa, Tokyo (JP); Koji Miyata, Tokyo (JP); Minori Miyata, legal representative, Fukui (JP); Atsushi Miyata, legal representative, Fukui (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/481,435

(22) Filed: May 25, 2012

(65) Prior Publication Data

US 2012/0291263 A1 Nov. 22, 2012

Related U.S. Application Data

(62) Division of application No. 12/608,595, filed on Oct. 29, 2009.

(30) Foreign Application Priority Data

Feb. 26, 2009 (JP) ................................. 2009-043525

(51) Int. Cl.
*H02K 15/03* (2006.01)
*H02K 1/27* (2006.01)
*H02K 16/02* (2006.01)

(52) U.S. Cl.
USPC ......... 29/598; 310/156.12; 310/114; 310/268

(58) Field of Classification Search .............. 29/598, 29/596, 592.1; 310/156.12, 156.13, 156.32, 310/156.36, 156.39, 112, 114, 268; *H02K 1/27, H02K 1/28, 16/02, 15/02, 15/03*
See application file for complete search history.

(56) References Cited

U.S. PATENT DOCUMENTS 5,397,951 A 3/1995 Uchida et al.
5,691,589 A * 11/1997 Keim et al. .................. 29/598

(Continued)

FOREIGN PATENT DOCUMENTS

EP 1850451 A1 10/2007
JP 62-213540 9/1987

(Continued)

OTHER PUBLICATIONS

International Search Report for International Application No. PCT/JP2008/061707.

*Primary Examiner* — Tran Nguyen
*Assistant Examiner* — Michael Andrews
(74) *Attorney, Agent, or Firm* — Roberts Mlotkowski Safran & Cole, P.C.

(57) ABSTRACT

A method for assembling rotors which is applicable to a large axial gap type permanent magnet rotating machine. A permanent magnet rotating machine comprising: a rotating shaft; at least two rotors comprising a table-like structure and permanent magnets attached thereto, the table-like structures being connected to the rotating shaft and being disposed in an axial direction of the rotating shaft; and a stator comprising a table-like structure and stator coils around which a copper wire is wound, said stator being disposed in a gap formed by the rotors so that the stator being separated from the rotating shaft, is manufactured by the following steps of assembling the two rotors such that a predetermined gap is formed therebetween; and mounting the magnets on the table-like structures by inserting the magnet from the radially outer side of the table-like structures towards the center of the rotation.

1 Claim, 7 Drawing Sheets

U.S. PATENT DOCUMENTS

| | | | |
|---|---|---|---|
| 6,081,052 A | 6/2000 | Hosoe et al. | |
| 6,803,696 B2 * | 10/2004 | Chen | 310/268 |
| 2005/0179336 A1 | 8/2005 | Hasebe et al. | |
| 2006/0138890 A1 | 6/2006 | Kato | |
| 2010/0072850 A1 * | 3/2010 | Miyata et al. | 310/156.12 |
| 2010/0277025 A1 * | 11/2010 | Doi et al. | 29/598 |
| 2012/0233848 A1 * | 9/2012 | Doi et al. | 29/596 |

FOREIGN PATENT DOCUMENTS

| | | |
|---|---|---|
| JP | 8-126277 A | 5/1996 |
| JP | 09-009538 | 1/1997 |
| JP | 10-164779 A | 6/1998 |
| JP | 2001-119878 | 4/2001 |
| JP | 2001-346345 | 12/2001 |
| JP | 2003-348805 A | 12/2003 |
| JP | 2006-14399 A | 1/2006 |
| JP | 2006-25573 A | 1/2006 |
| JP | 2006-03424 | 2/2006 |
| JP | 2006-174554 A | 6/2006 |
| JP | 2009-033946 A | 2/2009 |
| JP | 2009033946 A | 12/2009 |
| WO | 2006/077812 A1 | 7/2006 |
| WO | 2009/001917 | 12/2008 |

* cited by examiner

ROTARY TABLE FOR PERMANENT MAGNET ROTATING MACHINE AND METHOD FOR MANUFACTURING PERMANENT MAGNET ROTATING MACHINE This application is a Divisional of co-pending application Ser. No. 12/608,595, filed on Oct. 29, 2009, and claims foreign priority to JP2009-043525, filed on Feb. 26, 2009, the entire contents of each are hereby incorporated by reference in their entirety.

BACKGROUND OF THE INVENTION

1. Field of the Invention

The present invention relates to a permanent magnet rotating machine available for motors and generators, and more specifically to an axial gap type permanent magnet rotating machine in which rotors and a stator are arranged in the direction along a rotating shaft so that the rotors are oppositely disposed with the stator being interposed therebetween.

2. Description of the Related Art

There are various types of rotating machines used in a motor or a generator, including both a type that uses a permanent magnet as a magnetic field system and a type that uses a coil as a magnetic field system. While each type has its advantages and disadvantages, a permanent magnet rotating machine that uses a permanent magnet as a magnetic field system is generally employed when electric generation efficiency is important. This is because, when both types of the magnet rotating machines having the substantially same physical size are compared, the magnet rotating machine using a permanent magnet as a magnetic field system generates a magnetic field stronger than that of a generator using a coil as a magnetic field system. Thus, the density of magnetic flux that links with an armature coil increases, which results in a higher induced voltage.

From a viewpoint of structure, the permanent magnet rotating machines are classified into a radial gap type and an axial gap type. The radial gap type permanent magnet rotating machine comprises a cylindrical rotor, around which more than one magnet with a radial magnetization direction are disposed in the circumferential direction of the rotor, and a cylindrical stator that is located radially outside or inside the rotor and has coils arranged to face the permanent magnets. Since this rotor radiates magnetic flux only from its circumferential surface, the interior space of the rotor is an electrically useless space.

On the other hand, the axial gap type permanent magnet rotating machine comprises disk-shaped rotor that is fastened to a rotating shaft, and a stator that is disposed to face the rotor in the direction along the rotating shaft. The rotor has more than one permanent magnets fastened thereto, and the stator has more than one coils which are fastened thereto so as to respectively face the permanent magnets. Arranging two rotors on either side of a stator enhances the magnetic effect. Furthermore, owing to the recent improvement of the performance of permanent magnets, sufficient output has become ensured even if no iron core is provided in the coil. It is of course that further output can be provided when an iron core is provided in the coil.

Thus, with the axial gap type permanent magnet rotating machine, magnetic flux is radiated from a disk-shaped plane. Accordingly, if a structure in which such disks are stacked is employed, many surfaces from which magnetic flux radiates are formed in the interior space of the rotor. As a result, compared with the radial gap type permanent magnet rotating machine, the axial gap type permanent magnet rotating machine would be able to provide higher output per volume.

In the present state, however, the radial gap type is more commonly used. As one of the reasons therefor, it has been pointed out that, compared with the radial gap type, the axial gap type has a complex structure and is difficult to fabricate.

When a magnet is mounted on a rotor disk, as shown in FIG. 10, guide pins 113 are sticking up perpendicularly on a rotor disk 103, each magnet 104 is moved close to the rotor disk 103 from above through the guide pins 113, and the magnet is secured to the rotor disk by bonding, screwing, etc. For example, JP 2009-33946 A (in a schematic view), teaches mounting a magnet onto a rotary table from above of the rotary table. An attractive force of a small magnet is not so great. However, a larger rotating machine uses a larger magnet which provides a greater attractive force.

Furthermore, as shown in FIG. 11, it is required to form a gap for containing therein a stator coil by combining the rotors, each having the rotor disk 103, on which the magnets 104 are mounted, so as to face each other with a spacer 105 or the like being interposed therebetween. As a result, however, the magnetic attractive force between the rotors becomes strong, which makes it difficult to manufacture a large axial gap type rotating machine.

SUMMARY OF THE INVENTION

In view of the aforementioned circumstances, an object of the invention is to provide a rotary table which can be used for assembling rotors for an axial gap type rotating machine, and a method for assembling the rotors by which a force required for the assembling can be reduced.

The present invention is designed to solve the aforementioned problems. More specifically, a rotary table for a permanent magnet rotating machine, said rotary table may comprise a through hole and slots (grooves), wherein said through hole is located at a center of the rotary table so as to accept a rotating shaft; and said slots are formed at least in a region of the rotary table where permanent magnets are arranged so as to extend radially around the through hole to the circumferential surface of the rotary table.

Furthermore, an axial gap type permanent magnet rotating machine comprises: a rotating shaft; at least two rotors each comprising the rotary table of the invention and permanent magnets, said permanent magnets being mounted on a slot-forming surface (groove-forming surface) of the rotary table; the rotors being spaced apart in an axial direction of the rotating shaft, being arranged so that the slot-forming surfaces face to each other, and being rotatable together with the rotating shaft; a spacer for holding each gap formed by the at least two rotors; and a stator comprising a fixed table and coils supported by the fixed table, the stator being disposed in the gap formed by the at least two rotors, and being separated from the rotating shaft.

Furthermore, a method of manufacturing an axial gap type permanent magnet rotating machine according to the invention may comprise the steps of assembling the respective rotary tables of the at least two rotors such that a predetermined gap is formed therebetween, and assembling the rotors after inserting magnetized magnets in each rotary table towards the center of the radial rotation of the rotary table.

By means of the present invention, a permanent magnet rotating machine can be manufactured so that a gap between rotors is held with high dimensional accuracy, with a force less than hitherto when assembling the rotors. Furthermore, by means of the present invention, a larger permanent magnet rotating machine with higher output than hitherto can be fabricated with less force.

DETAILED DESCRIPTION OF THE PREFERRED EMBODIMENT(S)

This invention is directed to a method of manufacturing an axial gap type permanent magnet rotating machine, especially for providing a rotary table for a permanent magnet rotating machine, with which a larger permanent magnet rotating machine can be assembled with a less force than hitherto, and for providing a method for assembling the same.

As the physical size of axial gap type permanent magnet rotating machines increase, the number and physical size of magnets used therein increase.

Figure 10:
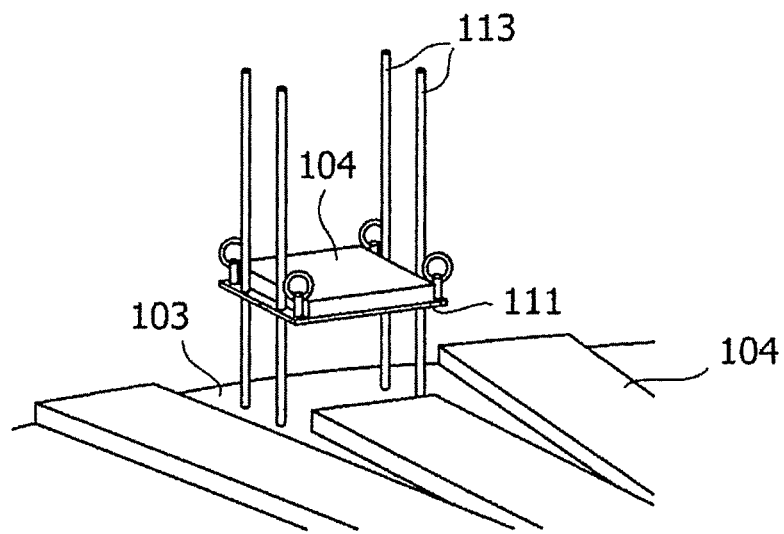
FIG. 10 is a schematic view illustrating a conventional method for mounting magnets on a rotary table.

With a method for mounting magnets to a rotor in which, for example, as shown in FIG. 10, each magnet is moved perpendicularly towards the face of a rotary table from above of the rotary table, it is required to move the magnet close to the rotary table while maintaining the state where the bottom surface of the magnet is parallel to the top surface of the rotary table. When a large magnetic poles are used, it is necessary that a single magnetic pole is constituted by two or more magnets and is formed between separately mounting the constituent magnets. In such a case, the magnetic field generated by an already mounted adjacent magnet produces an attractive force and/or a repelling force which act on a magnet to be mounted depending on a location where the magnet to be mounted is present. Thus, it becomes difficult to maintain the position of the magnet in parallel to the rotary table. This is because a subsequently mounted magnet is attracted and/or repelled by a previously mounted adjacent magnet, and thus is subjected to complex forces, depending on the distance therebetween.

Figure 12:
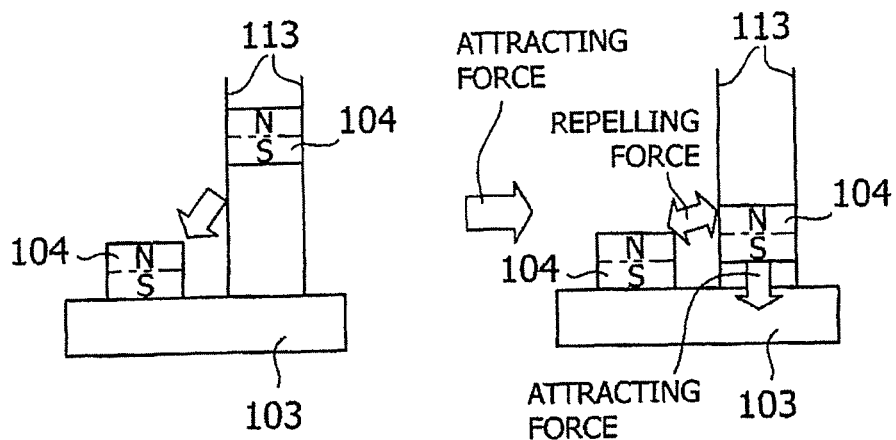
FIG. 12 is a schematic view showing forces acting between a magnet to be mounted from above and an already mounted magnet when a conventional method for mounting magnets is performed.
Figure 13:
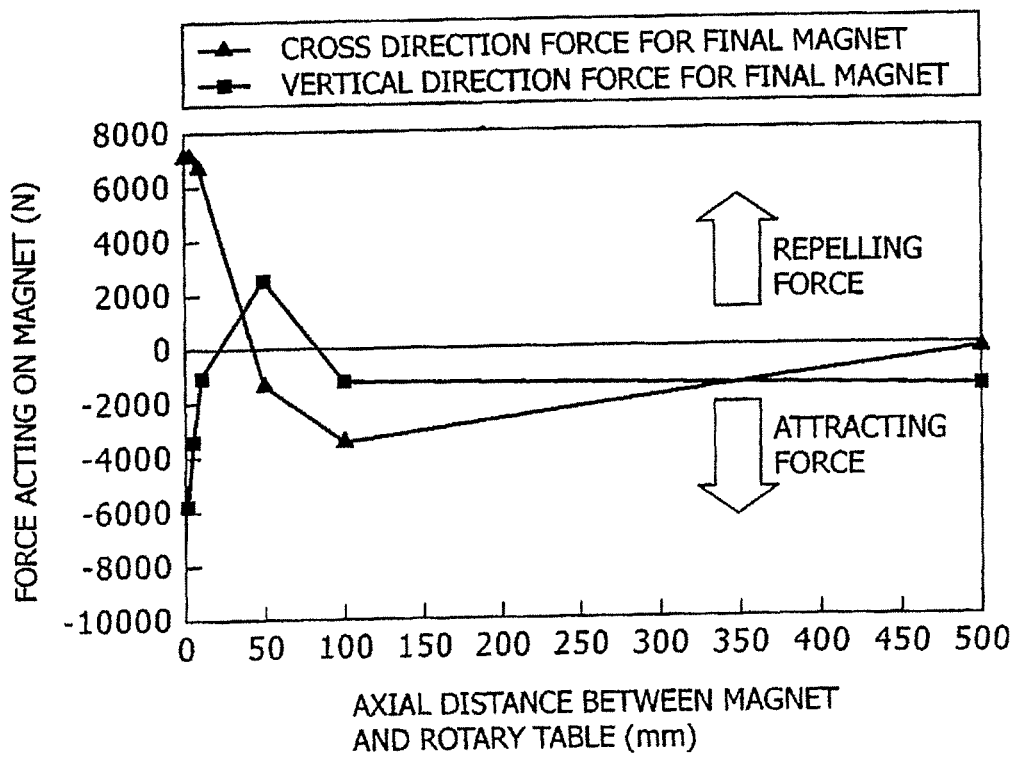
FIG. 13 shows a graph showing changes of forces acting on magnets when a magnet is moved downward when another magnet with the same polarity as that of the magnet to be moved downward has been already mounted adjacent to a target position by use of a conventional method for mounting magnets.

For example, for a large rotating machine in which magnetic poles having dimensions of 1600 mm by 400 mm by 50 mm are mounted, such a large pole as large as mentioned must be divided into a plurality of pieces for mounting. Here, let us consider to mount constituent pieces of the magnetic pole, each of which is magnetized as a magnet with dimensions of 400 mm by 400 mm by 50 mm, to a rotary table. As shown in FIG. 10, a magnetic plate 111 is bonded to a magnet 104, and holes are formed in the magnetic plate. Guide pins 113 are sticking up perpendicularly on a rotary table 103, the magnet 104 is slowly lowered by a crane or the like with the guide pins being passed through the holes of the magnetic plate. The first magnet can be easily mounted on the rotary table, because the first magnet is simply magnetically attracted by the rotary table. However, the next magnet undergoes the attractive force and the repelling force from the magnet already mounted on the rotary table. More specifically, as shown in FIGS. 12 and 13, when the magnet is lowered from above, depending on the distance from the rotary table, the magnet is first attracted by the magnet already mounted in a position adjacent a target position of the next magnet, and when the magnet is lowered to a certain point (at a distance 100 mm or less from the rotary table in FIG. 13), a vertical repelling force generates and the magnet cannot be normally mounted by simply lowering. When the magnet is further lowered, then the magnet is also subjected to a lateral repelling force. Thus, both lateral force and vertical force that the magnet undergoes change from an attractive force to a repelling force, controlling the position of the magnet is difficult.

Figure 11:
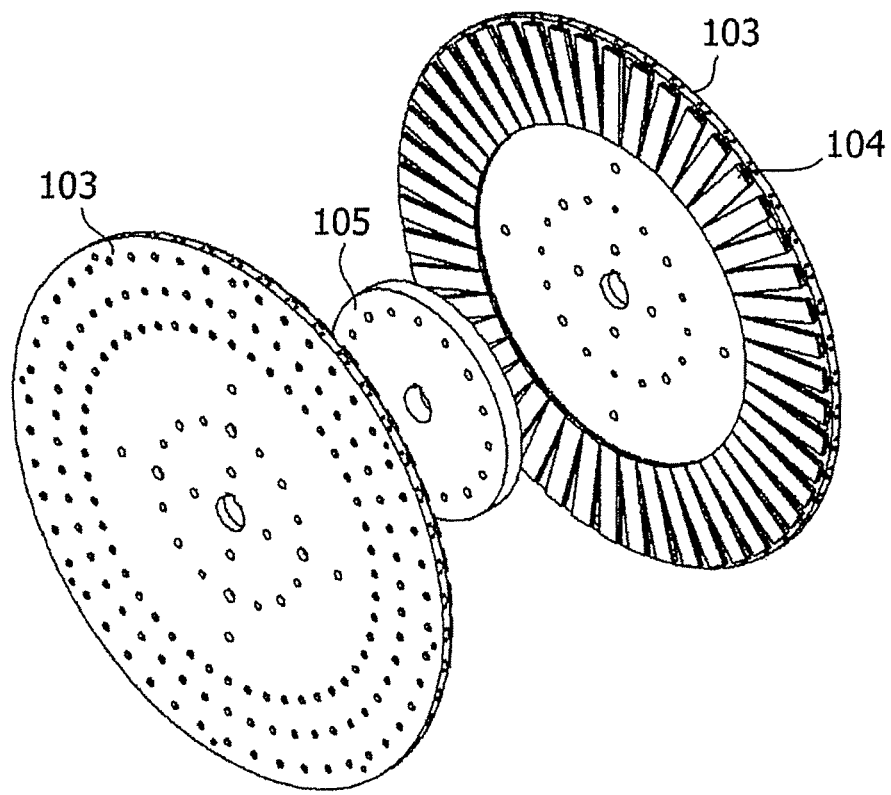
FIG. 11 is a schematic view illustrating a conventional method of assembling rotors, in which the rotary tables on which magnets are to be mounted are moved close to each other.

Furthermore, in this method for mounting magnets, the top surface of the rotary table must be open to the air, as shown in FIG. 11, a rotor after magnets are mounted must be moved close to each other until a predetermined gap is formed. In this case, a magnetically attractive force act between rotors. However, assembling the rotors suffers from a problem that as a rotor size increases, the attractive force between the rotors increases and the scale of the facility necessary for assembling the rotors increases.

Thus, the present inventors conceived of providing at least two rotary table on which no magnetized magnets are mounted, oppositely disposing and connecting the rotary tables via a spacer such that a gap is formed between the rotary tables, and then mounting magnets on the rotary table. This method can eliminate the need for a facility to deal with the attractive force between rotors during assembly. A force necessary for assembling the rotors is only a force for mounting individual magnets to a rotary table, which force is far smaller than the attractive force that is generated when oppositely disposing the rotors on which magnets are mounted.

For mounting the aforementioned magnetized magnet, for example, the magnetized magnet may be inserted by sliding the magnet on the rotary table from the radially outer side towards the center of the rotation thereof. This allows mounting magnets with a rotating shaft being inserted through the rotary tables of rotors. The rotary table is generally a magnetic material, and the magnetized magnet is attracted to the rotary table. At this time, the position of the magnet is maintained by the rigid rotary table.

In this case, of course, an attractive force from an adjacent magnet that is opposite in polarity is generated. Furthermore, when a constituent magnet that is divided as mentioned above is mounted, a repelling force to an adjacent divided magnet, which was previously mounted and is the same in polarity, is further generated.

First, regarding the position of the magnet, it is maintained as a result of attracting the magnet to the rotary table.

Figure 8:
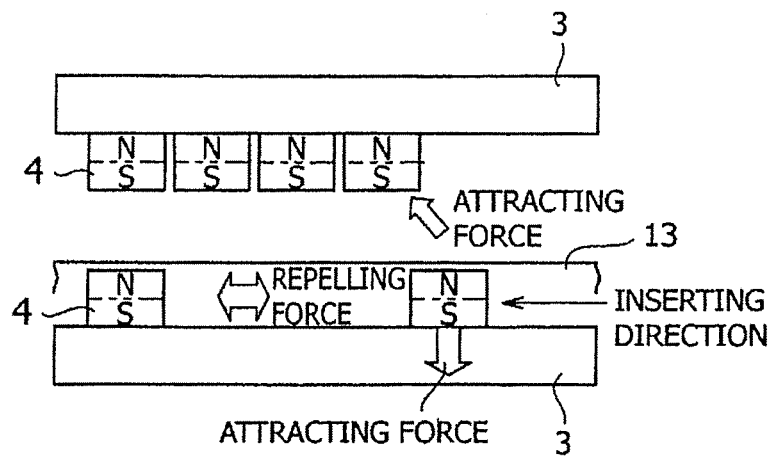
FIG. 8 is a schematic view showing forces acting between a magnet to be mounted and an already mounted magnet when the method of manufacturing a permanent magnet rotating machine of the invention is performed.
Figure 9:
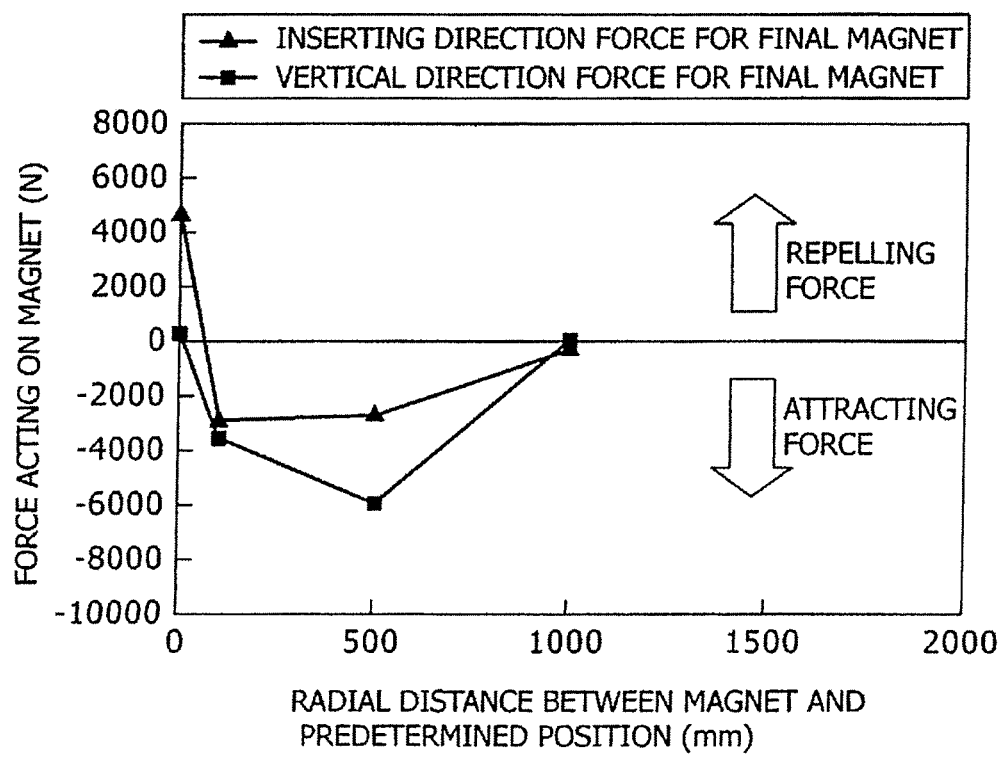
FIG. 9 is a graph illustrating changes of forces acting on magnets when the magnets are installed by slidingly advancing on the rotary table from its radially outer side towards its center of the rotation in a state where a magnet having the same polarity as that of the magnet to be mounted was already located adjacent to a target position on which the magnet to be mounted is mounted (hereinafter, the recitation may be simply referred to as "adjacent magnet"), by use of the method of manufacturing a permanent magnet rotating machine of the invention.

Next, regarding the attractive force from the magnet that was already mounted adjacent to the target position and is the opposite in polarity, such a force is undesirable because it may cause positional misalignment when the magnet is radially inserted from the radially outer side of the rotary table. This disadvantage can be overcome by providing on the rotary table a guide that extends to a predetermined position, and radially pressing the magnet from the outside of the rotary table while preventing the positional misalignment caused by the attractive force from the adjacent magnet. With this approach, as shown in FIGS. 8 and 9, the vertical magnetic force that the magnet undergoes is substantially always only an attractive force. Thus, the magnet stays attracted to the rotary table. Regarding the magnetic force in the magnet insertion direction, the magnet undergoes first an attractive force and finally a repelling force. By restricting the horizontal movement with a ridge-like guide 13 (ridge-shaped guide), the force what is required for mounting the magnet is only a force in an insertion direction. Insertion of the magnet can be facilitated by controlling the insertion direction force using a jack bolt or the like will facilitates.

According to one embodiment, a guide for inserting a magnet is a slot that is formed in the rotary table such that the slot is open towards the outside from the rotary table. Because this slot radially extends to the circumferential surface of the rotary table, if the slot has a width that is substantially the same as the width of the magnet, the insertion of the magnet is facilitated by radially inserting the magnet in a sliding manner along the slot from the radially outer side. According to another embodiment, a slot, that has a width substantially the same as the width of the magnet as mentioned above, is radially formed in the rotary table. (The slot is formed by another magnetic material on the rotary table with the same manner of forming a slot in a rotor.)

According to another embodiment of a guide for inserting a magnet, the width of the slot is smaller than the width of the magnet. In this case, a rib conforming to the slot is provided on a magnet itself or on a fixing member such as a plate for securing the magnet to the rotary table as described later, and the ridge is slidingly inserted in the slot from the circumferential surface. In this way, a magnet can be inserted in the slot formed in the rotary table.

The magnet can be secured to the rotary table in several ways. For example, the magnet may be secured to the rotary table by an adhesive applied to the magnet, and the magnet may be secured to the rotary table by a bolt, etc., after mounting the magnet in the rotary table and then covering with a nonmagnetic material or magnetic material (preferably, a nonmagnetic material). When a magnet is directly bonded to the rotary table, an adhesive is applied into a slot in advance, the magnet is inserted using the uncured adhesive as a lubricant, and finally the adhesive is cured to secure the magnet. After that, a metallic component having a width that is substantially the same as the width of the slot, and a height that is substantially the same as the height of the magnet is radially inserted in the slot in the rotary table from the radially outer side thereof. This metallic component is then secured to the rotary table and closes the slot like a cap, so that the force, which is caused by the centrifugal force applied to the magnet during rotation of rotor and acts towards in a radially outer ward direction, side, can be accommodated by the metallic cap. On the other hand, when a magnet is mounted with the magnet being bonded to a plate, the magnet can be secured to the rotary table by a bolt through an engagement hole formed in the plate.

With the aforementioned methods for inserting a magnet, even if the size of a rotating machine increases and the size of a magnet increases, such a large magnet can be adopted, for example, by dividing the magnet into several pieces, and separately mounting the divided pieces. The attractive force between the rotors varies depending on the magnetic flux density in the gap and the area of the magnet. The larger the area of the magnet, the greater the attractive force. According to the present invention, however, the force that acts of a magnet to be inserted from the radially outer side is only an attractive force between the rotary table and each magnet, and a repelling force between the divided magnets which are the same in polarity are inserted, which are depending on the physical size of the magnet. By dividing a magnet to be mounted into several pieces and mounting the divided magnet, a force necessary for inserting each divided magnet is less than that necessary for inserting the not-divided single magnet. Thus, according to the invention, fabricating a larger rotating machine does not require so much increase of the scale of facility.

The number of slots to be formed in a rotary table, which is not particularly limited, may be one for each magnet or magnetic pole or may be an integral multiple of the number of magnets or magnetic poles.

When inserting a magnet, it is preferable to apply a lubricant such as grease between the rotary table and a magnet, or between the rotary table and a magnetic plate. This can decrease the friction force therebetween by about a factor of 10.

As another way of mounting the aforementioned magnetic member, when a magnetizing facility which can apply a magnetic field to an entire rotor is present, a labor required for mounting magnets can be reduced by mounting magnets, to which the same magnetization direction will be imparted, to an assembled rotary table with the magnets being unmagnetized, applying a magnetic field to the entire rotor for magnetization, then, magnetizing magnets that have the opposite magnetization direction, and inserting the magnetized magnets into the rotor from the radially outer side thereof.

As a facility for applying a magnetic field to an entire rotor, a magnetization apparatus with an inner diameter of 700 mm in which a superconducting coil is used has been practically implemented.

The rotary table and the spacer may be fitted in a hole that is formed in a stator such that the hole has a diameter larger than the outer diameter of a spacer, after inserting the rotating shaft in the hole. Alternatively, a stator to which a large aperture that is larger than the diameter of the rotating shaft to be inserted therein from outside is formed may be installed between the rotors which have a rotary table through which a rotating shaft is inserted and have magnets inserted from the radially outer side of the rotor.

Specifically, a rotating machine must be provided such that a housing of a rotating machine can be divided into an end part and a body part, and the body part can be divided into two or more parts, and the stator in which a coil is mounted can be divided in the same manner as the body part of the housing. First, a rotating shaft and rotor is mounted on a bearing in the end part of the housing. Then, the divided stator is mounted to inside of the divided body part of the housing, and the body parts of the housing are assembled such that the stator is disposed within a gap between the rotors, in order to complete the rotating machine is fabricated.

The method for manufacturing a permanent magnet rotating machine of the invention as described above may be preferably used for manufacturing a generator or motor having an output of 2 kW or more, preferably 10 kW or more. The gap formed between the rotary tables is determined depending on the density of magnetic flux generated between the necessary magnets. Regarding the gap between the rotary tables, preferably, the gap between important magnets is, as a guide, is less than the narrow side of the magnetic pole on the rotary table. For example, if the magnetic pole mounted on the rotary table has a shape of a rectangular solid with dimensions of a radially extending length of 70 mm by a thickness of 5 mm by a width of 20 mm, the gap between the magnets may be preferably 20 mm or less, more preferably 10 mm or less. A diameter required for the rotary table of the generator or motor which can provide the output mentioned above is preferably 300 mm or more, and more preferably 500 mm or more.

The materials of a permanent magnet employed for the present invention, which are not particularly limited, include, for example, a ferrite magnet, an alnico magnet, and a rare-earth metal magnet. For a smaller rotating machine with higher output, it is desirable to use a neodium magnet which provides high energy product.

One embodiment according to the invention is illustrated in the accompanying drawings.

Figure 1A:
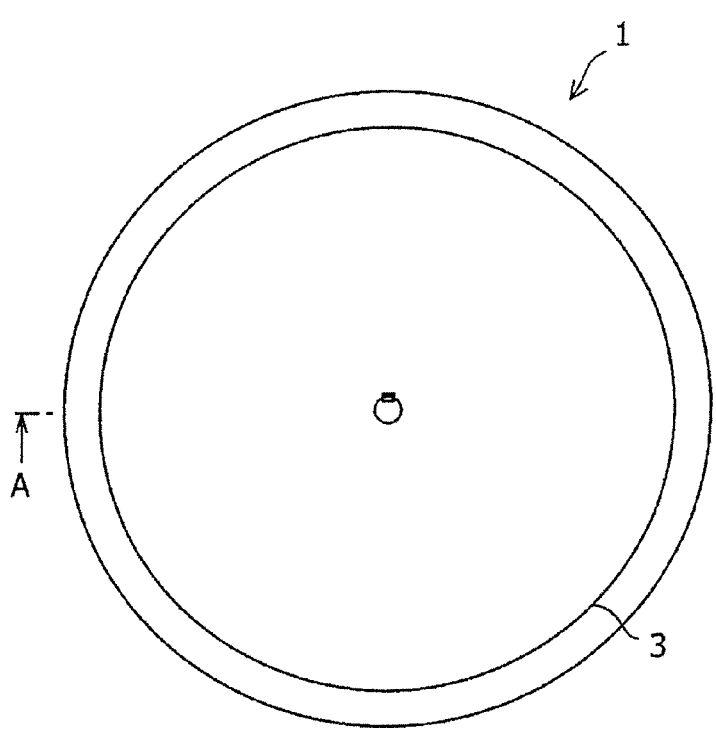
FIG. 1 (*a*) is a top view as viewed in the axial direction showing an axial gap type permanent magnet rotating machine to which a rotary table of the invention or a method for manufacturing a permanent magnet rotating machine of the invention is applied, FIG. 1(*b*) shows the same as viewed from the radially outside of the rotor, and FIG. 1(*c*) is a sectional view taken along line A-A of FIG. 1(*a*)
Figure 1B:
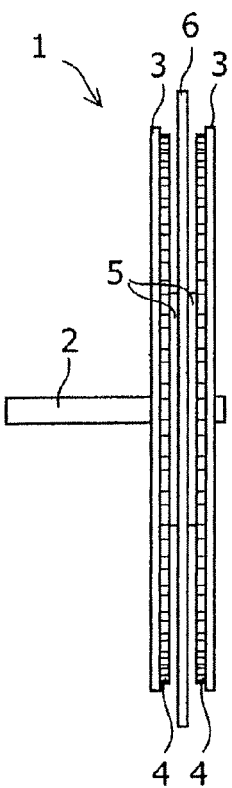
Figure 1C:
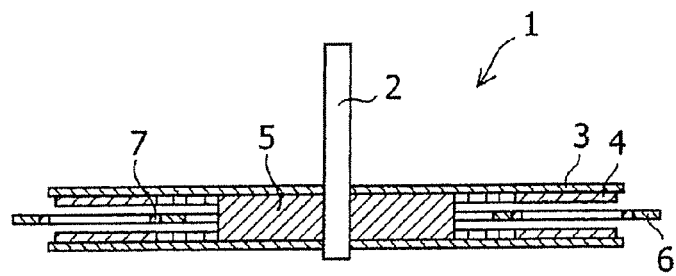

FIG. 1 shows a structure of a rotary table 3 according to the invention, or a structure of an axial gap type permanent magnet rotating machine 1 to which a method of manufacturing a permanent magnet rotating machine according to the invention can be applied. This rotating machine 1 comprises a rotating shaft 2, rotors that have a permanent magnet 4 and a rotary table 3 in which a through hole in which the rotating shaft 2 is inserted is formed, a spacer 5 for holding a gap between the rotors, and a stator comprising a fixed table 6 and a coil 7 supported by the fixed table. The rotors are spaced apart in the axial direction of the rotating shaft 2 and arranged so that the slot-forming surfaces face to each other. The rotors are rotatable together with the rotating shaft. The stator is disposed in the gap formed between the at least two rotors, and is separated from the rotating shaft.

Figure 2:
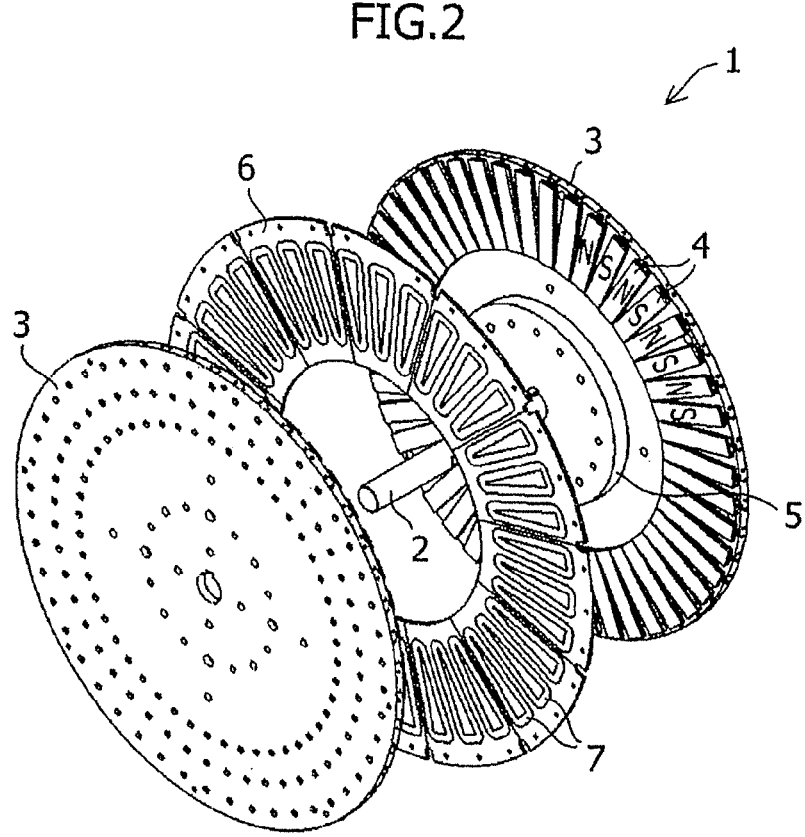
FIG. 2 is a schematic exploded view showing components of the permanent magnet rotating machine of FIG. 1.

As shown in FIG. 2, magnets 4 are radially arrayed on a radially outermost region of the rotary table 3 so that north and south poles are alternated. On the other rotary table, magnets are arrayed in the same way. The positional relationship between the rotors are determined such that the magnets on one rotor and the oppositely polarized magnets on the other rotor face to each other via the gap therebetween. The stator having coils 7 thereon are disposed between the rotors. The magnetic flux from the magnet 4 links with the coil as an alternating magnetic field with rotation of the rotors.

Figure 3:
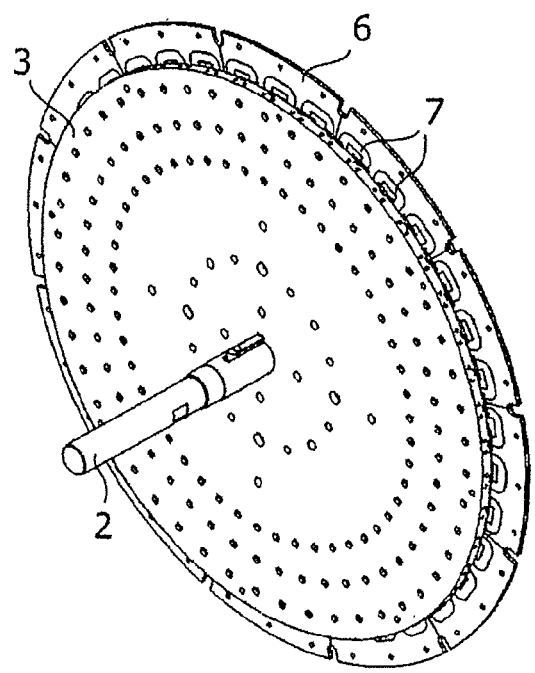
FIG. 3 is a schematic view showing an embodiment of a permanent magnet rotating machine having a stator disposed between rotors according to the invention.

FIG. 3 shows an example of the axial gap type permanent magnet rotating machine to which the present invention is applied. A spacer 5 for defining a width of the gap is disposed between rotors, and permanent magnets are arrayed as magnetic poles on a radially outermost region of the rotary table 3 of the rotor.

Figure 4:
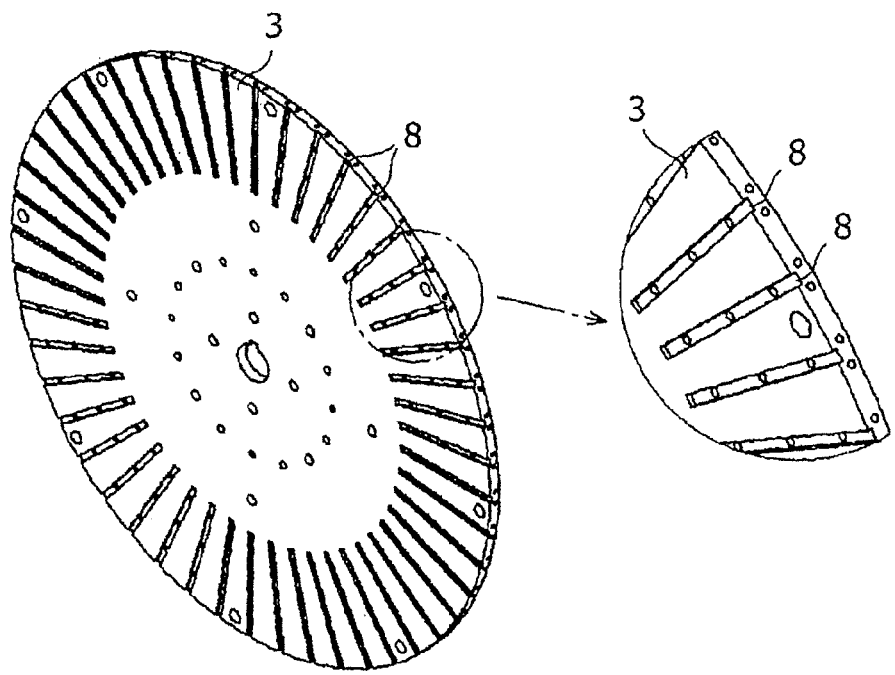
FIG. 4 is a schematic view showing an embodiment of a rotary table of a permanent magnet rotating machine according to the invention.

Referring to FIG. 4, slots 8, the number of which is the same as the number of the magnets, are formed in the rotary table 3 so that each slot radially extends to the circumferential surface of the rotary table 3.

Figure 5:
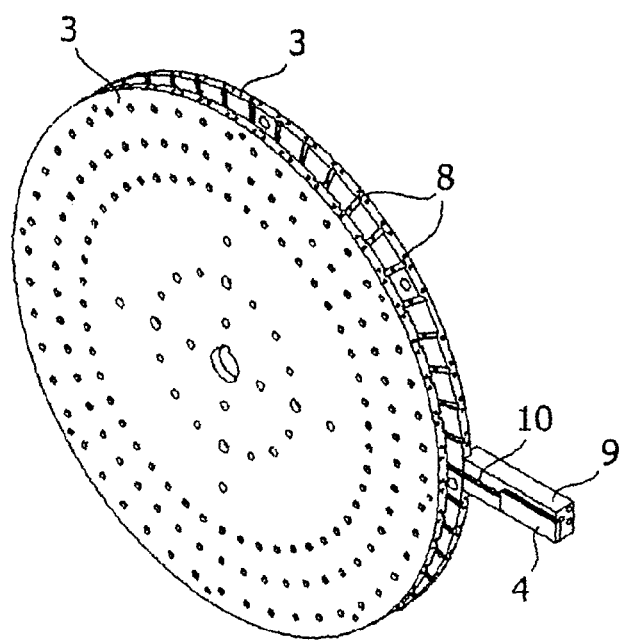
FIG. 5 is a schematic view illustrating an embodiment of a method for manufacturing a permanent magnet rotating machine, especially a method of mounting magnets to a rotary table, according to the invention.

FIG. 5 shows a state during inserting a magnet into a rotating table 3 that is disposed opposite to another rotary table 3. A guide rail 9 having a guide slot (guide groove) 10 is attached to the rotary table so that the guide slot 10 extends to a slot 8, which is formed in the rotary table so as to radially extend to the circumferential surface of the rotary table. The magnet 4 is inserted in the guide slot 10 and subsequently in the slot 8 by pressing the magnet 4 with a jack bolt (not shown) from the radially outer side. In this embodiment, as in the embodiment shown in FIG. 2, a gap is defined by a spacer (not shown) between the rotary tables 8. Thus, the feature is applied thereto as it is. Specifically, FIG. 5 shows an example that a magnet is inserted in a predetermined position from the radially outer side of the rotor with the rotors being assembled like that. In this case, by providing the slots 8 in the rotary table 3, the movement of the magnet can be restricted so that the direction into which the magnet is pressed is not offset by the attractive force from the adjacent magnet. Using the slot as a rail facilitates control of the position of the magnet.

In this way, the guide (nonmagnetic material) is provided at the radially outer end of the rotary table 3 so that the slot is extended, and the magnet is first disposed on the guide and then radially slid into the rotary table along the slot.

Figure 6:
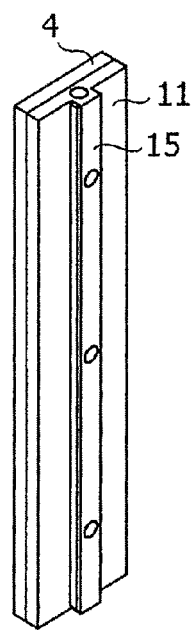
FIG. 6 is a schematic view showing a combination manner of a permanent magnet and a plate, which manner is suitable for insertion into a rotary table for a permanent magnet rotating machine according to the invention.

Furthermore, as shown in FIG. 6, it is also possible that a plate with a ridge that conforms to the slot is bonded to a magnet in advance, and that the magnet is mounted by inserting the ridge into the slot as a guide rail.

Figure 7:
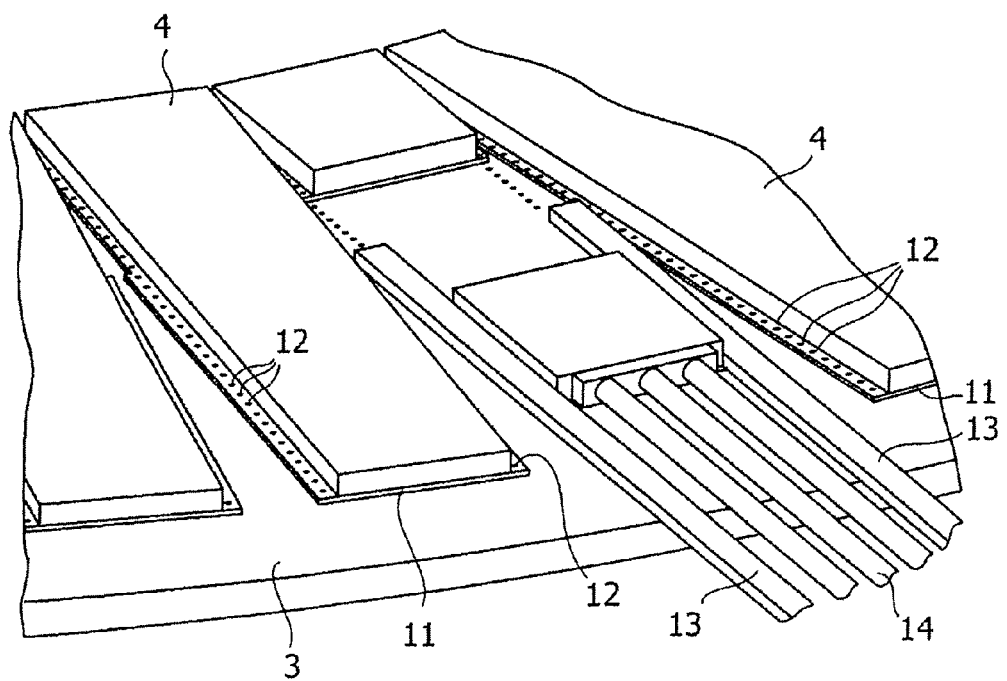
FIG. 7 is a schematic view illustrating an embodiment of a method for manufacturing a permanent magnet rotating machine, especially a method of mounting magnets on a rotary table, according to the invention.

FIG. 7 shows an embodiment in which a magnetic plate 11 is bonded to a magnet 4 with an adhesive. On the surface of the magnetic plate 11 on the side contacting with the rotary table 3, two ridge-like guides 13 for preventing lateral offset, which can define a gap with a width substantially the same as the width of the magnet, are temporarily provided in a removable manner. The ridge-like guide rails are fixed by means of threaded holes (not shown) which are formed in advance in the rotary table. Then, the magnets which are bonded to the magnetic plate and magnetized are inserted towards the center of rotation from the radially outer side by a pushing bar 14 such that the magnet moves along the ridge-like guide rails while preventing lateral offset of the magnet, and secure the magnet at a predetermined position. The magnet 4 is secured to the rotary table 3 via the threaded holes formed in the magnetic plate 11.

After the magnets are mounted on one of the rotary tables in this way, the magnets are mounted on the opposite rotary table thereto via the spacer.

It should be noted that a force required for the method is only a force for mounting the magnet from the radially outer side of the rotary table. This is mainly a friction force with the rotor caused by a magnetic attractive force. The magnitude of the force, for example, for a 2 kW class generator is about 80 N. However, since the friction force can be reduced by about a factor of 10 by lubricating with grease or the like, the magnet can be mounted without using much force.

In contrast, when magnet is mounted from above of a rotor as with a conventional method, the greatest force is required when the oppositely disposed rotors are moved close to each other until a predetermined gap of 7 mm is defined therebetween. For a 2 kW class generator, the attractive force is 7600 N, which is two or more orders of magnitude greater than the attractive force when the present invention is used. In this case, a larger facility than that of the present invention is necessary.

Thus, also from the comparative description as described above, superiority of the rotary table according to the invention and the method of manufacturing a permanent magnet rotating machine according to the invention is apparent.

What is claimed is:

1. A method of manufacturing an axial gap type permanent magnet rotating machine, the rotating machine comprising:
    a rotating shaft;
    at least two rotors, each rotor comprising a through hole in which the rotating shaft is inserted, a rotary table in which a plurality of holes are provided in a manner radially spaced from the through hole, and permanent magnets which are mounted on the rotary table, the rotors being spaced apart in an axial direction of the rotating shaft, being arranged so that the magnet-mounting surfaces face to each other with a gap in between, and being rotatable together with the rotating shaft;
    a spacer for holding each gap formed by the at least two rotors; and
    a stator comprising a fixed table and coils supported by the fixed table, the stator being disposed in each gap formed by the at least two rotors, and being separated from the rotating shaft,
the method comprising the steps of:
forming the gap between rotary tables of the at least two rotors by oppositely disposing the at least two rotors via the spacer; and
temporarily providing a removable rib-like guide on a side of the rotary table where magnets are to be mounted so that the guide extends from a center of rotation towards a radially outer side of the rotary table,
wherein the permanent magnets are secured to a magnetic plate by bonding, threaded holes are formed in the plate, a resultant composite including the permanent magnets and the plate is magnetized, and then inserted in the rib-like guide, and secured to the rotary table via the threaded holes.

* * * * *